(12) United States Patent
Sun et al.

(10) Patent No.: US 8,131,148 B2
(45) Date of Patent: Mar. 6, 2012

(54) OPTICAL TRANSMITTER ERROR REDUCTION USING RECEIVER FEEDBACK

(75) Inventors: Han Sun, Ottawa (CA); Kuang Tsan Wu, Kanata (CA); Kim B. Roberts, Nepean (CA)

(73) Assignee: Ciena Corporation, Linthicum, MD (US)

( * ) Notice: Subject to any disclaimer, the term of this patent is extended or adjusted under 35 U.S.C. 154(b) by 785 days.

(21) Appl. No.: 12/211,216

(22) Filed: Sep. 16, 2008

(65) Prior Publication Data
US 2010/0067902 A1    Mar. 18, 2010

(51) Int. Cl.
   H04B 10/08    (2006.01)
   H04B 10/00    (2006.01)
   H04B 10/04    (2006.01)
   H04B 10/12    (2006.01)

(52) U.S. Cl. .............. 398/25; 398/158; 398/192

(58) Field of Classification Search .......... 398/9, 29, 398/147, 159, 162, 183, 192, 194, 195, 206, 398/208, 209, 25
See application file for complete search history.

(56) References Cited

U.S. PATENT DOCUMENTS

| | | | |
|---|---|---|---|
| 5,161,044 A * | 11/1992 | Nazarathy et al. | 398/194 |
| 6,084,924 A | 7/2000 | Melas | |
| 6,246,500 B1 | 6/2001 | Ackerman | |
| 6,999,678 B2 | 2/2006 | Corbeil et al. | |
| 7,292,653 B2 | 11/2007 | Wu et al. | |
| 7,292,792 B2 | 11/2007 | Chen et al. | |
| 7,330,667 B2 | 2/2008 | Fells | |
| 7,356,256 B1 | 4/2008 | Strawczynski et al. | |
| 7,418,212 B1 | 8/2008 | Bontu | |
| 2003/0058494 A1 | 3/2003 | Roberts et al. | |
| 2006/0127102 A1 | 6/2006 | Roberts et al. | |

OTHER PUBLICATIONS

International Search Report for PCT/US2009/056199 dated Oct. 23, 2009; 2 pgs.
U.S. Appl. No. 11/533,438, filed Sep. 20, 2006, entitled "Automatic Gain Control in a Coherent Optical Receiver"; 29 pages.

* cited by examiner

*Primary Examiner* — Armando Rodriguez
(74) *Attorney, Agent, or Firm* — Christopher & Weisberg, P.A.

(57) ABSTRACT

Described is a method of reducing transmitter error in an optical communications channel. An optical signal transmitted from an optical transmitter that has impairment due to transmitter error is processed to generate a digitally-equalized signal. A nonlinear characteristic of the digitally-equalized signal that relates to the transmitter error is determined. An optical control signal comprising data that are based on the nonlinear characteristic is transmitted to the optical transmitter. The optical transmitter modifies a transmitter parameter in response to the optical control signal to change the nonlinear characteristic and thereby reduce the impairment.

17 Claims, 6 Drawing Sheets

OPTICAL TRANSMITTER ERROR REDUCTION USING RECEIVER FEEDBACK

FIELD OF THE INVENTION

The invention relates generally to optical communications networks. More particularly, the invention relates to a method and system for reducing optical transmitter signal error in an optical signal transmitted through an optical communications network and detected at an optical receiver.

BACKGROUND OF THE INVENTION

The need for higher data rates has put significant demands on optical communications. Requirements on network performance continue to increase and component specifications have become more stringent. Optical networks employing coherent detection receivers have considerable advantages over direct detection receivers for high data rate communications. One type of coherent detection used to achieve higher bit rate communications is quadrature carrier modulation. Data to be transmitted are used to modulate an in-phase signal and a quadrature signal for each of two orthogonal polarizations of an optical signal, enabling data rates that are four times the data rates of many other modulation schemes for similar network configurations.

The ability to successfully transmit data from an optical transmitter to an optical receiver through an optical communications channel can be impaired by errors introduced at the transmitter. For example, a quadrature phase shift keying (QPSK) modulator typically includes two Mach-Zehnder (MZ) modulators biased at 90° with respect to each other. Any variation from the 90° bias is referred to as transmit quadrature error and can result in degradation of the communications system performance. Although bias control can be used to reduce quadrature error, and to control gain and gain balancing, bias control can introduce errors based on nonlinearities in the drive controls and chirp in the MZ modulators. Such errors can be difficult and expensive to detect at the optical transmitter.

Typically, each MZ modulator is biased at extinction at its half wave voltage $V_\pi$ and is driven by a data signal having a binary excursion of $2V_\pi$ to produce a binary phase shift keying (BPSK) signal. Any error in the bias voltage $V_{bias}$ applied to a MZ modulator to achieve extinction results in a DC tone in the transmitted optical signal. This error is referred to as carrier leakage and degrades the optical signal to noise ratio (OSNR).

The two BPSK signals generated in a QPSK modulator are ideally time-aligned so that there is no time difference between the data signals applied to the MZ modulators. Sampling phase errors occur if the BPSK signals are not time-synchronized to within a small fraction of the data rate of the signal applied to the two MZ modulators. Sampling phase error leads to degradation of the bit error rate (BER) at the optical receiver.

Quadrature error, carrier leakage, IQ timing error and the difference in the DC gain of the I and Q channels (IQ gain error) at the optical transmitter generally vary in time due to environmental changes. Detection of these errors at the optical transmitter is difficult and requires expensive and complex implementations.

The present invention addresses the need to reduce impairments to the optical signals based on the transmitter errors identified above and provides additional advantages.

SUMMARY OF THE INVENTION

In one aspect, the invention features a method of reducing transmitter error in an optical communications channel. An optical signal transmitted from an optical transmitter and having impairment due to transmitter error is processed to generate a digitally-equalized signal. A nonlinear characteristic of the digitally-equalized signal that is indicative of the transmitter error is determined. An optical control signal comprising data that are based on the nonlinear characteristic is transmitted to the optical transmitter and a transmitter parameter of the optical transmitter is modified in response to the optical control signal to change the nonlinear characteristic.

In another aspect, the invention features a method of reducing transmitter error in a QPSK optical communications channel. A QPSK optical signal transmitted from an optical transmitter and having impairment due to transmitter error is processed to generate a digitally-equalized QPSK signal. A nonlinear characteristic of the digitally-equalized QPSK signal is determined. The nonlinear characteristic is indicative of the transmitter error. An optical control signal comprising data that are based on the nonlinear characteristic is transmitted to the optical transmitter and a transmitter parameter of the optical transmitter is modified in response to the optical control signal to change the nonlinear characteristic.

In yet another aspect, the invention features an optical communications system that includes an optical receiver configured to receive an optical signal from an optical transmitter. The optical receiver includes a memory module, a digital processor and a control module. The memory module stores data derived from a prior digital sampling of the optical signal and configured in a lookup table. The digital signal processor communicates with the memory module and generates a digitally-equalized optical signal according to the data stored in the memory module and a digital sampling of the optical signal. The digital signal processor determines a nonlinear characteristic of the digitally-equalized optical signal. The control module communicates with the digital signal processor and is configured to transmit a control signal to the optical transmitter in response to the determined nonlinear characteristic.

In still another aspect, the invention features an optical transmitter that includes a modulated optical source and an optical receiver. The modulated optical source generates an optical signal comprising optical data to be transmitted to a remote optical receiver and generates a tapped optical signal. The optical receiver is colocated with the modulated optical source and is configured to receive the tapped optical signal. The optical receiver includes a memory module to store data derived from a prior digital sampling of the tapped optical signal. The stored data is configured in a lookup table. The optical receiver also includes a digital signal processor that communicates with the memory module. The digital signal processor generates a digitally-equalized signal according to the data stored in the memory module and a digital sampling of the tapped optical signal. The digital signal processor determines a nonlinear characteristic of the digitally-equalized signal and provides a control signal to the modulated optical source whereby a transmitter parameter is adjusted in response to the control signal to reduce an impairment of the optical signal due to a transmitter error.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

In brief overview, the invention relates to a method of reducing transmitter error in an optical communications channel. In one embodiment, an optical signal transmitted from an optical transmitter is processed to generate a digitally-equalized signal. A nonlinear characteristic indicative of a transmitter error is determined from the digitally-equalized signal. A control signal comprising data based on the nonlinear characteristic is sent to the optical transmitter and used to modify a transmitter parameter to cause a change in the nonlinear characteristic. The method provides for the reduction or elimination of certain transmitter errors. For example, quadrature error, carrier leakage and IQ timing error for a QPSK optical signal can be reduced. Consequently, the reach of the optical communications system can be increased and the cost to customers or subscribers reduced. The method is particularly useful for next generation systems (e.g., 100 Gbit/s systems) in which transmitter bias errors are more limiting to system performance.

Figure 1:
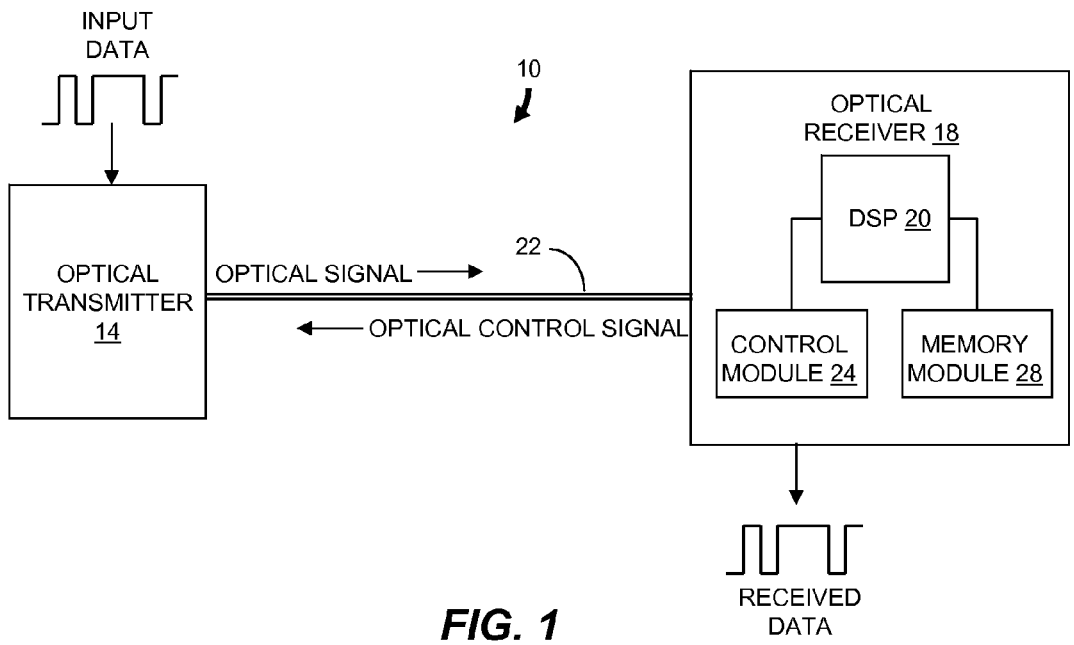
FIG. 1 illustrates an optical communications system in which an embodiment of the method of the invention can be practiced.

FIG. 1 illustrates an example of an optical communications system 10 with which the method of the invention can be applied. The system 10 includes an optical transmitter 14 coupled to an optical receiver 18 through a communications channel 22 such as a long-haul optical fiber. The optical transmitter 14 transmits an optical signal over the communications channel 22. The optical signal at the receiver is sampled using analog-to-digital converters (ADCs, not shown) and the digital data are provided to a digital signal processor (DSP) 20. Various digital processing is performed by the DSP 20 to generate a digitally-equalized signal. Digital equalization can include, by way of example, compensating for signal degradation of the optical signal during propagation through the communications channel 22 due to chromatic dispersion, polarization mode dispersion or both. The DSP also determines a non-linear characteristic of the digitally-equalized signal and uses this information for generation of a control signal that is transmitted back to the optical transmitter 14. Preferably the control signal is transmitted over the communications channel 22 as an optical control signal although in some embodiments the control signal can be transmitted to the optical transmitter 14 through a separate communications channel. The control signal is received at the optical transmitter and is used to control one or more transmitter parameters to reduce the transmitter error.

In one embodiment, the system 10 is a quadrature carrier optical communications system utilizing orthogonal polarization channels and is adapted for high data rate (40 Gbit/s) communications using similar network components to those found in a conventional direct detection optical network configured for a lower data rate (10 Gbit/s). An input data signal applied to the optical transmitter 14 is used to modulate the two quadrature carriers for each of two orthogonal polarization components of an optical signal.

Figure 2:
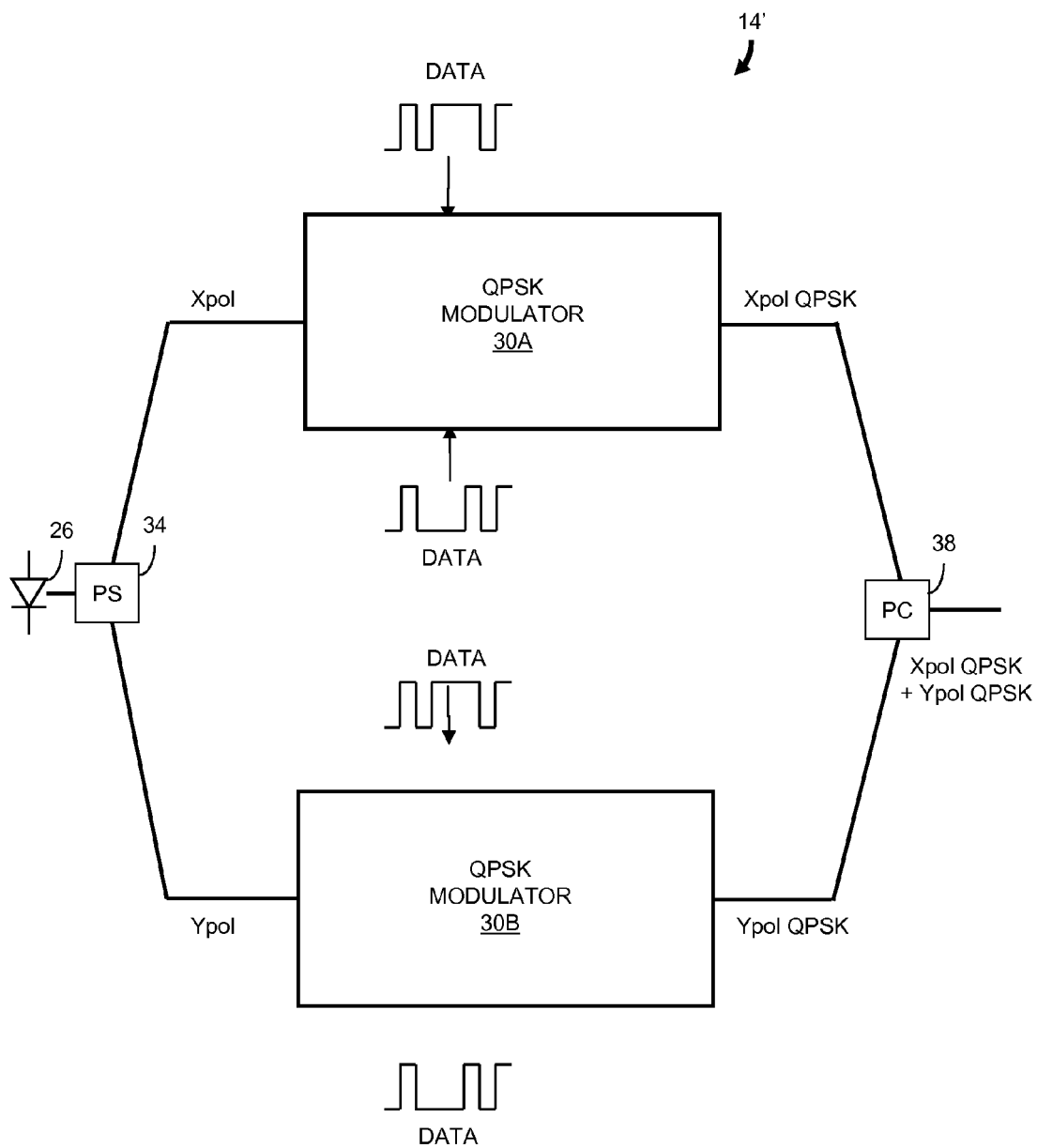
FIG. 2 illustrates a QPSK optical transmitter that can be controlled to reduce transmitter errors according to an embodiment of the invention.

FIG. 2 shows a QPSK optical transmitter 14' that can be used as the transmitter 14 of FIG. 1. The transmitter 14' includes an optical source 26, two quadrature phase shift keying (QPSK) modulators 30A and 30B (generally 30), a polarization splitter PS 34 and a polarization combiner PC 38. By way of example, the optical source 26 can be a distributed feedback (DFB) laser diode or an injection-locked laser diode that generates a single frequency optical carrier signal as is known in the art. The polarization splitter 34 is configured with respect to the optical source 26 to provide two orthogonally-polarized optical signals Xpol and Ypol. Data signals DATA are provided to each QPSK modulator 30 to modulate two quadrature optical carriers (i.e., an "I carrier" and a "Q carrier") and thereby generate the two QPSK signals. The two QPSK signals are combined by the polarization combiner 38 and coupled to the communications channel 22 (e.g., an optical fiber in a wavelength division multiplexing (WDM) system) for transmission to the optical receiver 18.

Figure 3:
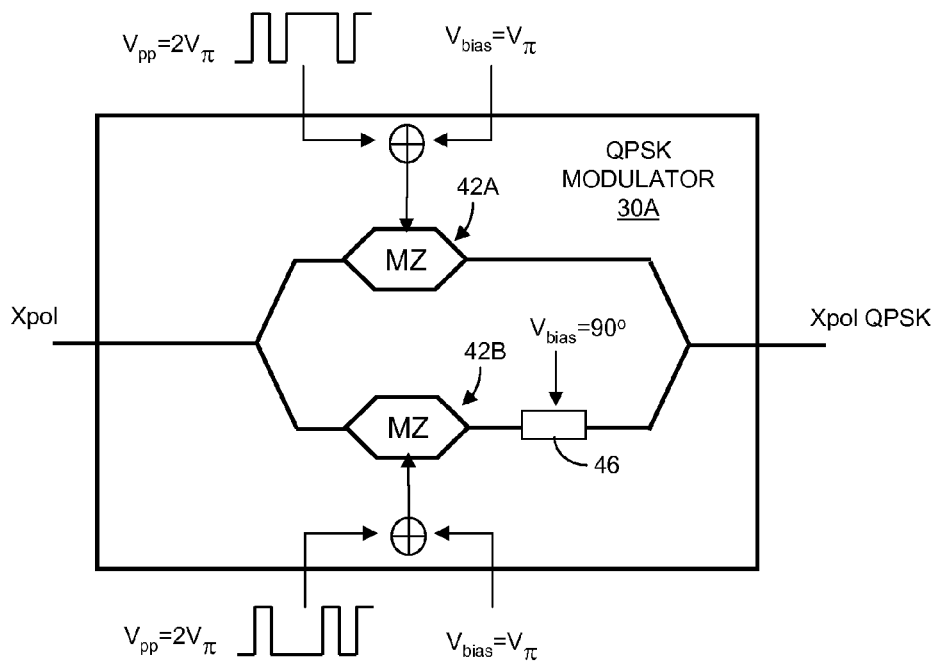
FIG. 3 illustrates one of the QPSK modulators of FIG. 2 in more detail.

FIG. 3 shows the QPSK modulator 30A for the Xpol optical signal in more detail. It should be recognized that the QPSK modulator 30B for the Ypol optical signal is similarly configured. The QPSK modulator 30A includes two MZ modulators 42A and 42B (generally 42) that receive a portion of the polarized optical signal Xpol. The optical path after one MZ modulator 42B includes a voltage controlled electro-optic bias component 46 to create a 90° phase difference between the optical signals from the two MZ modulators 42. Thus the two optical signals are in-phase (I) and quadrature (Q) optical signals. Each MZ modulator 42 is biased at extinction by the application of a half wave voltage $V_\pi$. I and Q modulation is achieved by applying to each MZ modulator 42 a respective non-return-to-zero (NRZ) data signal having a peak-to-peak voltage excursion $V_{pp}$ of $2V_\pi$.

Figure 4:
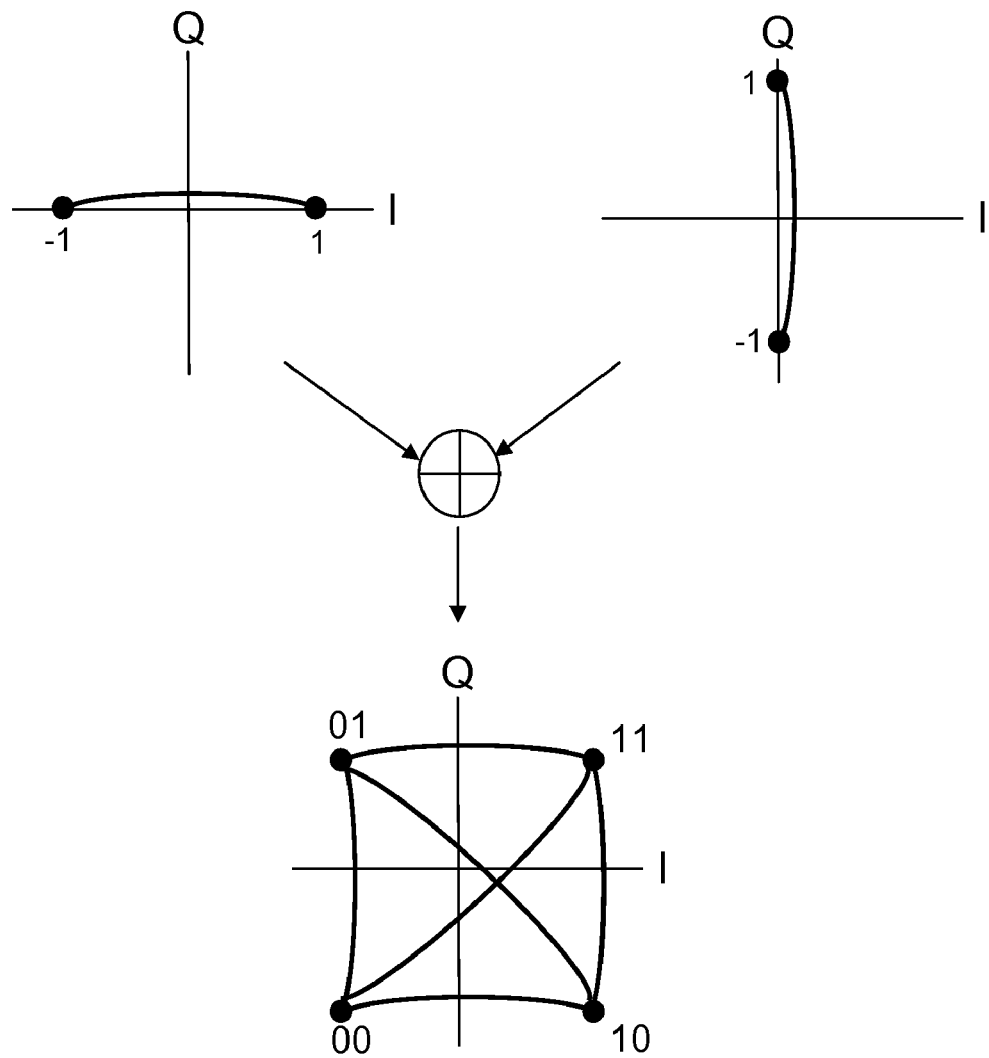
FIG. 4 illustrates the constellation for the QPSK optical transmitter of FIG. 2.

The QPSK signal encodes two bits in the phase of the optical signal Xpol as shown in the QPSK constellation of FIG. 4. More specifically, one MZ modulator 42A generates a binary phase shift keying (BPSK) modulation represented as −1 or 1 along the I axis and the other MZ modulator 42B generates a BPSK modulation along the Q axis. The QPSK signal generated by the QPSK modulator 30B for the orthogonal polarization signal Ypol also encodes two bits. Thus four-bit symbols are generated by the optical transmitter 14'. Consequently, the optical transmitter configuration provides a 10 Gsymbol/s symbol rate that corresponds to a 40 Gbits/s bit rate. Coherent detection and digital signal processing are performed at the receiver 18 to extract the transmitted data.

Figure 5:
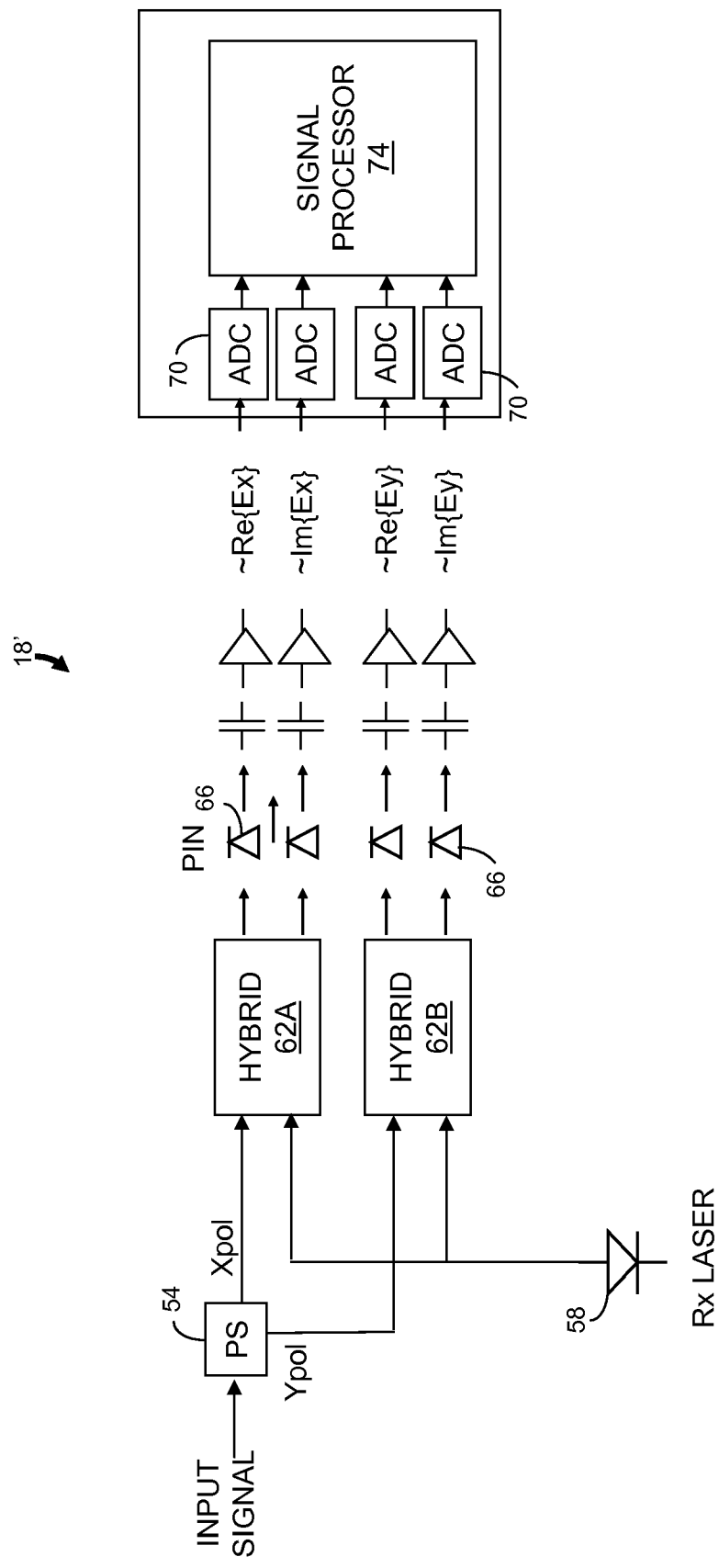
FIG. 5 is a functional block diagram illustrating a coherent optical receiver for QPSK optical communications that can be used to practice an embodiment of the method of the invention.

FIG. 5 is a functional block diagram illustrating a coherent optical receiver 18' for QPSK optical communications that can be used as the receiver 18 of FIG. 1. The receiver 18' includes a polarization beamsplitter PS 54, a receiver local oscillator laser 58, two optical hybrids 62A and 62B (generally 62), PIN detectors 66, ADCs 70 and DSP 74. The polarization beamsplitter 54 provides the two orthogonally polarized optical signals Xpol and Ypol. Each hybrid 62 provides an I channel and a Q channel optical signal to respective PIN detectors 66. The electrical I channel and Q channel signals are sampled by the ADCs 70 at twice the respective bit rate (e.g., 20 Gsamples/s) and the resulting digital signals are received by the DSP 74. The DSP 74 processes these digital signals according to any of a variety of equalization schemes to generate digitally-equalized signals. For example, the equalization can be based on a least mean squares (LMS) or maximum likelihood sequential estimation (MLSE) processing technique.

Again referring to FIG. 1, the ability to accurately transmit data through an optical communications channel is adversely affected by errors in the optical signal generated by the optical transmitter 14. The method of the present invention permits the determination of certain types of transmitter error at the optical receiver 18. Data representative of the errors are sent from the optical receiver 18 back to the optical transmitter 14. Preferably, the error data are sent in an optical control signal in reverse direction over the same optical communications channel 22 as the transmitted optical signal. Alternatively, the error data can be sent to the optical transmitter 14 over a physically separate communications channel. In a bi-directional implementation using the common optical communications path 22, the determined transmitter errors can be communicated to the transmitter 14 using bits embedded in the overhead of a predefined frame format. In one embodiment, the data sent from the receiver 18 to the transmitter 14 represent the errors as determined by the receiver 18 and the transmitter 14 further processes such data to determine the appropriate adjustments of transmitter parameters to reduce the transmitter errors. Alternatively, the data sent from the receiver 18 to the transmitter 14 are control data that are used to directly adjust transmitter parameters to reduce transmitter errors. In an alternative embodiment, components of the optical receiver 18 are colocated with (i.e., disposed proximate to) the optical transmitter 14 so that digital equalization is performed on the optical signal before transmission through the optical communications channel 22. For example, a coherent optical receiver embedded in the optical transmitter 14 can use an optical tap (e.g., a power splitter) to remove a small portion of the optical power of the optical source 26 (see FIG. 2) for use as a local oscillator. Thus transmitter errors can be determined at the transmitter 14 and the need to transmit an optical control signal back through the communications channel 22 is avoided. To reduce expense, the I and Q optical signals can be tapped in the optical transmitter 14 before combination, and each tapped optical signal is sampled with high speed ADCs. The relative delay between the tapped signals can be measured and the result used to adjust the delay in one or both channels to reduce or eliminate the relative delay.

After equalization is performed at the receiver 18, two lookup tables (LUTs) are used to estimate the three symbol nonlinear inter-symbol interference (ISI). Each LUT corresponds to one of the polarized optical symbols Xpol or Ypol and includes 64 complex number entries for the three symbol ISI configuration. In an alternative embodiment, a single substantially larger LUT (e.g., having 4,096 ($2^{12}$) entries) can be used for both polarizations with appropriate modifications to the method described below.

Figure 6:
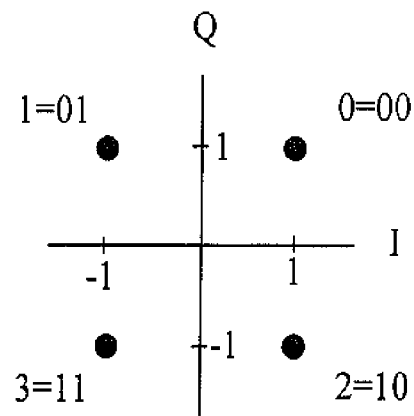
FIG. 6 illustrates an ideal QPSK constellation for a polarized optical signal for a two-bit optical constellation.

FIG. 6 shows an ideal QPSK constellation for one of the polarized optical signals. Gray coding is used for mapping the information bits onto the QPSK signal to ensure for most times one bit error per symbol error if errors should occur. Each LUT entry corresponds to one of the four possible values for each of the three successive symbols. More specifically, the LUT for the Xpol optical signal is populated with the averaged Xpol equalized signal samples according to a three QPSK symbol pattern which is addressed according to a six bit representation of the decoded symbols. The LUT for the Ypol optical signal is similarly populated. This can be accomplished initially by analyzing equalized samples for each of the 64 bit patterns and then updating the LUTs slowly in time.

Figure 7:
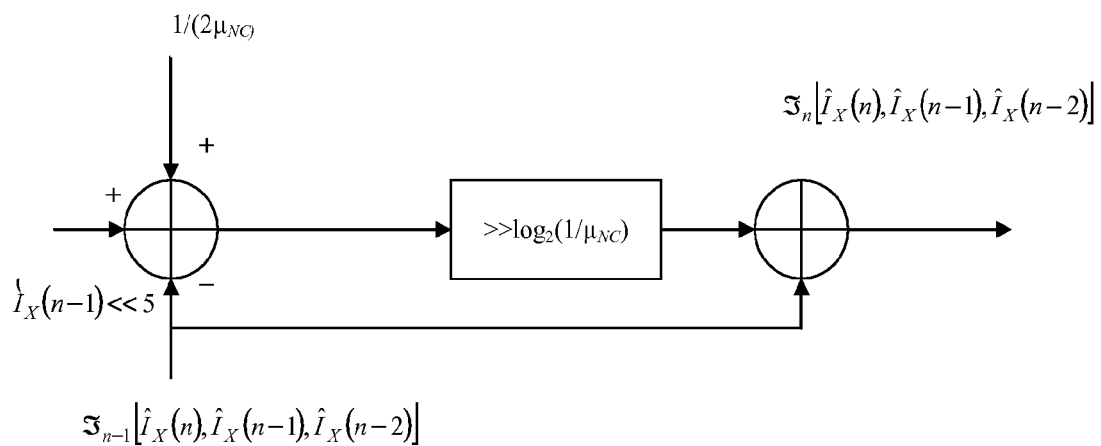
FIG. 7 is a functional block diagram of a circuit for performing a lookup table update for a polarized optical signal for three successive symbols according to an embodiment of the invention.

In more detail, the LUT entries are determined using a training procedure and the entry values for each LUT are continuously updated using data from the corresponding polarized optical signal Xpol or Ypol. For the Xpol optical signal, the updating of the entries of the corresponding LUT is given by $$\Im_n[\hat{I}_X(n),\hat{I}_X(n-1),\hat{I}_X(n-2)]=\Im_{n-1}[\hat{I}_X(n),\hat{I}_X(n-1),\hat{I}_X(n-2)]+\mu_{NC}[\tilde{I}_X(n-1)*32-\Im_{n-1}[\hat{I}_X(n),\hat{I}_X(n-1),\hat{I}_X(n-2)]]$$

where $\tilde{I}_x(n)$ represents the soft output data for the Xpol optical signal after equalization and carrier recovery and $\hat{I}_x(n)$ represents the detected symbols from the Xpol optical signal, i.e., the decisions based on $\tilde{I}_x(n)$. The values n−1 and n−2 correspond to the previous two symbols. The value of $\hat{I}_x(n)$ is used to determine the appropriate address of the LUT. $\Im_n[\hat{I}_X(n),\hat{I}_X(n-1),\hat{I}_X(n-2)]$ represents the LUT entry at LUT location $[\hat{I}_X(n),\hat{I}_X(n-1),\hat{I}_X(n-2)]$ for symbol n (or time n). The LUT entries are updated according to the detected symbol decisions $\hat{I}_x(n)$ as shown in the second term in the updating expression where $\mu_{NC}$ is a step size (scalar value) and the value of 32 in the second term is used to increase the resolution of the LUT by five bits. Preferably the LUTs are updated at rates that enable tracking of system changes that occur at rates of less than 1 Hz to 10 KHz or more. A functional representation of a circuit for performing the LUT update process is shown in FIG. 7.

In one embodiment, the 64 addresses for the LUT are determined as follows:

LUT_ADDRESS=Index($\hat{I}_X(n-1)$)*16+Index($\hat{I}_X(n)$)*4+Index($\hat{I}_X(n-2)$)

where the value of Index is given below in Table 1.

TABLE 1

| $\hat{I}_X(n)$ [I, Q] | Index |
|---|---|
| [0, 0] | 0 |
| [0, 1] | 1 |
| [1, 0] | 2 |
| [1, 1] | 3 |

Referring again to FIG. 6, in one embodiment the LUT has 64 entries T as described above. The symbol values of 0, 1, 2 and 3 are represented by points in the upper right, upper left, lower right and lower left quadrants of the constellation, respectively. Each entry is designated by $T_{x-y-z}$ where x, y and z designate the prior, current and subsequent symbols of the three symbol sequence. Thus the real part of a LUT entry corresponding to a symbol sequence of 3-1-2 can be expressed as $T_{3-1-2}^{Re}$, $T_{11-01-10}^{Re}$ or $T_{-1-1,-1+1,+1-1}^{Re}$ according to the corresponding symbol values, bit values or IQ space values, respectively. As used as follows, LUT entries are generally designated according to the IQ space value representation.

Linear ISI data can be extracted from the LUT contents. The residual ISI impulse response i'[k] and q'[k] are given by $$i'[k] = i[k] \otimes h^{II}[n] + q[k] \otimes h^{QI}[n]$$

and $$q'[k] = i[k] \otimes h^{IQ}[n] + q[k] \otimes h^{QQ}[n]$$

where $\otimes$ designates convolution, i[k] and q[k] are orthogonal information bits and i'[k] and q'[k] are output bits that include the residual ISI.

There are 12 values associated with the impulse response h that are to be extracted from the entries for the two LUTs. These values are designated as $$h_{-1}^{II}, h_{-1}^{QI}, h_{-1}^{IQ}, h_{-1}^{QQ}$$

$$h_0^{II}, h_0^{QI}, h_0^{IQ}, h_0^{QQ}$$

$$h_{+1}^{II}, h_{+1}^{QI}, h_{+1}^{IQ}, h_{+1}^{QQ}.$$

where the −1, 0 and 1 subscripts designate the three sample taps, i.e., the immediately preceding sample in time, the current sample, and the immediately following sample in time. In alternative embodiments, additional samples can be employed for improved performance; however, the size of the LUT and the processing complexity increase substantially.

Using the symbol sequence 3-1-2 as an example, the corresponding IQ values are −1−1, −1+1, and +1−1 (see FIG. 6). The impulse responses $h^{II}$ and $h^{QI}$ are calculated from the real portion of the LUT entries and the impulse responses $h^{IQ}$ and $h^{QQ}$ are calculated from the imaginary portion of the LUT entries. Thus, for linear convolutional filtering as described above, the real portion $T^{Re}$ and imaginary portion $T^{Im}$ of the LUT entry are related to the impulse response h by:

$$T_{-1-1,-1+1,+1-1}^{Re} = -h_{-1}^{II} - h_{-1}^{QI} - h_0^{II} + h_0^{QI} + h_1^{II} - h_1^{QI}$$

$$T_{-1-1,-1+1,+1-1}^{Im} = -h_{-1}^{IQ} - h_{-1}^{QQ} - h_0^{IQ} + h_0^{QQ} + h_1^{IQ} - h_1^{QQ}$$

A set of 128 linearly dependent equations associated with the 64 real entries and the 64 imaginary entries can be derived. There are 12 unknown variables to solve for the impulse response h.

In preference to performing a rigorous solution to the 128 equations, an embodiment of the method of the invention contemplates a simplification based on known relationships among the entries of the LUTs. For example, $h_{-1}^{II}$ is related to the real portion of the LUT and is given by $$h_{-1}^{II} = \frac{T_{11,11,11}^{Re} - T_{-11,11,11}^{Re}}{2} = \frac{T_{11,11,1-1}^{Re} - T_{-11,11,1-1}^{Re}}{2}.$$

The difference between the first and second terms (in either numerator) is due only to the value of the first input bit ("1" to "−1"). The other five bits have a value of "1" for each term. Thus a solution for $h_{-1}^{II}$ can be determined as long as the first bit value for the two terms changes between "1" to "−1" and the values for the remaining five bits for the two terms remain the same. Consequently, there are 32 (i.e., $2^5$) possible solutions for $h_{-1}^{II}$. Assuming an equal probability of occurrence for the 64 bit input bit sequences, the true linear impulse response is determined as the average of the 32 possible permutations of the last five bits. Thus the solution for $h_{-1}^{II}$ is given by $$h_{-1}^{II} = \frac{1}{32} \sum_{\forall abcde \in \{-1,1\}} \frac{T_{1a,bc,de}^{Re} - T_{-1a,bc,de}^{Re}}{2}$$

where a, b, c, d and e represent the five unchanged bits.

The value of $h_{-1}^{QI}$ is only affected by the value of the second bit and therefore its solution is given by $$h_{-1}^{QI} = \frac{1}{32} \sum_{\forall abcde \in \{-1,1\}} \frac{T_{a1,bc,de}^{Re} - T_{a-1,bc,de}^{Re}}{2}.$$

Similarly, the values of $h_0^{II}$, $h_0^{QI}$, $h_{+1}^{II}$ and $h_{+1}^{QI}$ are only affected by the third, fourth, fifth and sixth bits, respectively, therefore there solutions are given by $$h_0^{II} = \frac{1}{32} \sum_{\forall abcde \in \{-1,1\}} \frac{T_{ab,1c,de}^{Re} - T_{ab,-1c,de}^{Re}}{2}$$

$$h_0^{QI} = \frac{1}{32} \sum_{\forall abcde \in \{-1,1\}} \frac{T_{ab,c1,de}^{Re} - T_{ab,c-1,de}^{Re}}{2}$$

$$h_{+1}^{II} = \frac{1}{32} \sum_{abcde \in \{-1,1\}} \frac{T_{ab,cd,1e}^{Re} - T_{ab,cd,-1e}^{Re}}{2}$$

$$h_{+1}^{QI} = \frac{1}{32} \sum_{abcde \in \{-1,1\}} \frac{T_{ab,cd,e1}^{Re} - T_{ab,cd,e-1}^{Re}}{2}.$$

The impulse responses $h^{IQ}$ and $h^{QQ}$ are determined from the imaginary portion of the LUT entries. The impulse response $h_{-1}^{IQ}$ is only affected by the first bit and therefore its solution is given by $$h_{-1}^{IQ} = \frac{1}{32} \sum_{\forall abcde \in \{-1,1\}} \frac{T_{1a,bc,de}^{Im} - T_{-1a,bc,de}^{Im}}{2}.$$

The impulse response $h_{-1}^{QQ}$ is only affected by the second bit and therefore its solution is given by $$h_{-1}^{QQ} = \frac{1}{32} \sum_{\forall abcde \in \{-1,1\}} \frac{T_{a1,bc,de}^{Im} - T_{a-1,bc,de}^{Im}}{2}.$$

One of skill in the art will recognize that all other impulse responses can be derived from the entries of the LUTs using a similar analysis to that provided above.

As described above, certain transmitter errors such as quadrature error, carrier leakage, IQ timing error and IQ gain error limit the ability to successfully transmit data from an optical transmitter to an optical receiver through an optical communications channel. Estimation of these errors according to the method of the invention is based on the LUT entries described above. In a bi-directional system, the determined errors can be transmitted back to the optical transmitter, for example, by using bits embedded in the overhead of a predefined frame format. The optical transmitter is tuned according to the transmitted error bits to reduce the transmitter errors and improve the performance of the optical communications system. The following paragraphs describe the determination of various transmitter errors based upon the values of the entries in the LUTs.

To estimate the carrier leakage, an "M vector" having four components M[0] to M[3] representing the four QPSK constellation points averaged over the 16 possible neighboring symbols is calculated as follows:

$$M[0] = \frac{1}{16} \sum_{\forall abcd \in \{-1,1\}} T_{ab,11,cd}$$

$$M[1] = \frac{1}{16} \sum_{\forall abcd \in \{-1,1\}} T_{ab,-11,cd}$$

$$M[2] = \frac{1}{16} \sum_{\forall abcd \in \{-1,1\}} T_{ab,-1-1,cd}$$

$$M[3] = \frac{1}{16} \sum_{\forall abcd \in \{-1,1\}} T_{ab,1-1,cd}.$$

The magnitude (in dB) of the carrier leakage is determined as the mean of the M vector and is given in as the average power in dB of the constellation points minus the square of the mean of the M vector expressed in dB and is given by $$CarrierLeakMag(\text{dB}) =$$

$$10 \cdot \log 10 \left[ \left| \frac{1}{4} \sum_{j=0}^{3} M[j] \right|^2 \right] - 10 \cdot \log 10 \left[ \frac{1}{4} \sum_{j=0}^{3} |M[j]|^2 \right].$$

The phase of the carrier leakage (in radians) is determined from the values of the M vector as $$CarrierLeakPhase(\text{rad}) = \tan^{-1}\left[ \frac{\text{Im}\left\{ \frac{1}{4} \sum_{j=0}^{3} M[j] \right\}}{\text{Re}\left\{ \frac{1}{4} \sum_{j=0}^{3} M[j] \right\}} \right].$$

The IQ gain error, quadrature error and IQ delay (IQ timing error) can be determined from the impulse responses described above.

The IQ gain error, defined as the DC power on the Q channel relative to the DC power on the I channel. Consequently, the IQ gain error can be expressed as $$I\text{-}Q \text{ Gain Error}(\text{dB}) = 10 \cdot \log 10 \left( \frac{P_Q}{P_I} \right)$$

$$= 10 \cdot \log 10$$

$$\left( \frac{(h_{-1}^{IQ} + h_0^{IQ} + h_{+1}^{IQ})^2 + (h_{-1}^{QQ} + h_0^{QQ} + h_{+1}^{QQ})^2}{(h_{-1}^{II} + h_0^{II} + h_{+1}^{II})^2 + (h_{-1}^{QI} + h_0^{QI} + h_{+1}^{QI})^2} \right).$$

The quadrature error expressed in radians is given by $$I\text{-}Q \text{ Quad Error (rad)} =$$

$$\tan^{-1}\left( \frac{(h_{-1}^{IQ} + h_0^{IQ} + h_{+1}^{IQ})}{(h_{-1}^{QQ} + h_0^{QQ} + h_{+1}^{QQ})} \right) + \tan^{-1}\left( \frac{(h_{-1}^{QI} + h_0^{QI} + h_{+1}^{QI})}{(h_{-1}^{II} + h_0^{II} + h_{+1}^{II})} \right).$$

Figure 8:
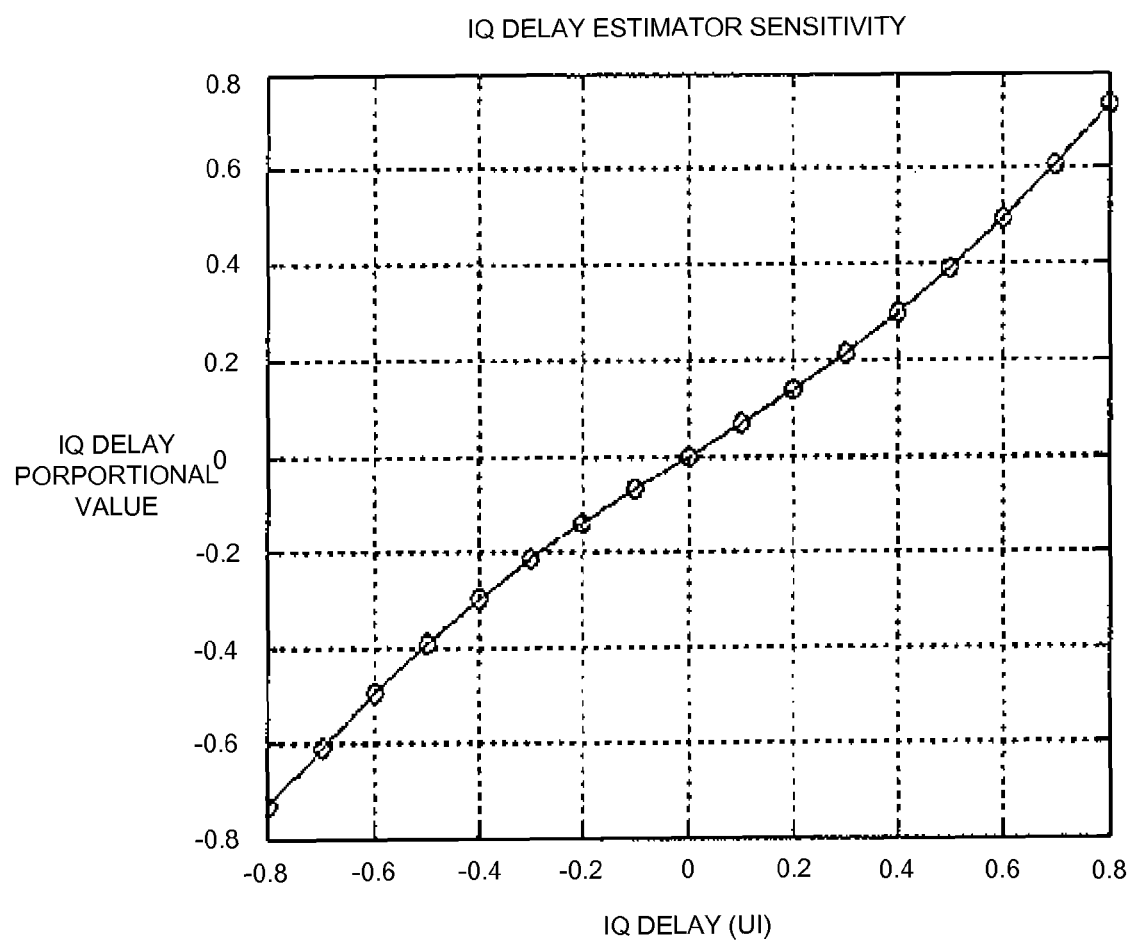
FIG. 8 is a graphical depiction of a simulation of the IQ delay proportionality value as a function of the actual IQ delay for a QPSK optical system that shows a substantially linear relationship that can be used in a feedback control mechanism to tune an optical transmitter according to an embodiment of the invention.

Sampling phase errors occur if the IQ timing error is not less than a small fraction (e.g., 10%) of the bit period. The IQ delay (or IQ timing error) is given by $$I\text{-}Q \text{ Delay} \propto \frac{h_{+1}^{II} - h_{-1}^{II}}{h_{-1}^{II} + h_0^{II} + h_{+1}^{II}} - \frac{h_{+1}^{QQ} - h_{-1}^{QQ}}{h_{-1}^{QQ} + h_0^{QQ} + h_{+1}^{QQ}}.$$

where the first term is proportional to the delay on the I channel and the second is proportional to the delay on the Q channel. This calculation is an extension of the clock-recovery algorithm for a single channel as described in Kurt H. Mueller and Markus Muller, "Time Recovery in Digital Synchronous Data Receivers," IEEE Transactions on Communications, Vol. COM-24, No. 5, May 1976, pages 516-531. The value of the IQ delay determined in this manner is a proportional quantity that is normalized to a unit interval value related to the symbol rate and which may be utilized for feedback control of the optical transmitter. FIG. 8 shows a simulation of the IQ delay proportionality value as a function of the actual delay. The functional relationship is substantially linear such that it can be used for tuning the optical transmitter in a feedback control mechanism.

The invention is not limited to the embodiments described above but instead can also be applied to other type of communications systems. Although the above description is directed primarily to the correction of transmitter errors for a QPSK optical signal, the invention contemplates control of an optical transmitter based on a nonlinear characteristic determined from other types of optical signals after digital equalization. Moreover, the number and configuration of various components can differ from those illustrated and described above. For example, the number of LUTs and DSPs may be different. In one such embodiment burst sampling of the optical signal is performed and the sampled data are stored in a memory module and passed to an "offline DSP" to determine one or more transmitter errors. The sampling duration can be brief (e.g., microseconds) although sufficient can still be obtained to enable a determination of various transmitter errors. Thus the digital processing load of the main DSP is reduced and the offline DSP can utilize a lower processing speed.

The method of the invention is not limited to reducing the transmitter errors and adjustment of the transmitter parameters identified above. For example, signal pulse shaping can be separately applied to the I and Q channels. The optical receiver estimates the impulse response for the two channels as previously described and forwards the impulse responses to the optical transmitter. A DSP at the optical transmitter then interprets the forwarded data and, using digital-to-analog converters (DACs) with sufficient bandwidth and filtered digital data (e.g., from a transmitter DSP) for transmission, adjusts the signal pulse shapes for optimum transmission. Alternatively, analog RF equalization can be employed instead of utilizing the DAC configuration.

In another example, MZ modulator chirp, which contributes to cross-talk between the I and Q channels, can be reduced. The impulse responses $h^{IQ}$ and $h^{QI}$ estimated by the optical receiver are related to the chirp and can be transmitted to the optical transmitter. A DSP in the optical transmitter processes the $h^{IQ}$ and $h^{QI}$ data and performs IQ cross-talk cancellation using high-bandwidth DACs.

Although the embodiments described above relate primarily to two-bit optical constellations, it should be understood that the method of the invention contemplates reduction of transmitter errors for optical signal having optical constellations based on higher numbers of bits such as 4-QAM optical signals, 16-QAM optical signals. Such signals have impairments that can be defined in mathematically different formats from those described above for the QPSK embodiments. The reduction of the transmitter errors for these optical signals is performed in a similar manner: the optical receiver first digitally-equalizes the optical signal and then determines the appropriate control signal to send to the optical transmitter to reduce certain transmitter errors defined for the optical signal.

While the invention has been shown and described with reference to specific embodiments, it should be understood by those skilled in the art that various changes in form and detail may be made therein without departing from the spirit and scope of the invention as recited in the accompanying claims.

What is claimed is:

1. A method of reducing transmitter error in an optical communications channel, the method comprising:
   processing an optical signal transmitted from an optical transmitter to generate a digitally-equalized signal, the optical signal having impairment due to transmitter error, the processing of the optical signal transmitted from the optical transmitter to generate a digitally-equalized signal comprising:
      sampling and digitizing the transmitted optical signal; and
      processing the digitized optical signal to generate the digitally-equalized signal;
   determining a nonlinear characteristic of the digitally-equalized signal wherein the nonlinear characteristic is indicative of the transmitter error;
   transmitting an optical control signal to the optical transmitter wherein the optical control signal comprises data that are based on the nonlinear characteristic; and
   modifying a transmitter parameter of the optical transmitter in response to the optical control signal to change the nonlinear characteristic.

2. The method of claim 1 wherein the optical signal propagates through an optical communications channel and the optical control signal is transmitted to the optical transmitter over an optical communications channel.

3. The method of claim 1 wherein the determination of nonlinear characteristic comprises calculation of nonlinear inter-symbol-interference based on stored data and an estimate of the data in the transmitted optical signal.

4. The method of claim 1 wherein the determination of the nonlinear characteristic compromises calculation of nonlinear inter-symbol-interference based on stored data and known data in the transmitted optical signal.

5. The method of claim 1 wherein the optical signal has a multi-bit optical constellation.

6. The method of claim 5 wherein the optical control signal is responsive to a difference in the multi-bit optical constellation relative to an ideal multi-bit optical constellation.

7. The method of claim 1 further comprising processing the digitally-equalized signal comprises using a least mean squares processing technique to determine the transmitted data.

8. The method of claim 1 further comprising processing the digitally-equalized signal using a maximum likelihood sequential estimation processing technique to determine the transmitted data.

9. A method of reducing transmitter error in a QPSK optical communications channel, the method comprising:
   processing a QPSK optical signal transmitted from an optical transmitter to generate a digitally-equalized QPSK signal, the QPSK optical signal having impairment due to transmitter error, the processing of the QPSK optical signal transmitted from the optical transmitter to generate a digitally-equalized QPSK signal comprises:
      sampling and digitizing the transmitted QPSK optical signal; and
      processing the digitized QPSK optical signal to generate the digitally-equalized QPSK signal;
   determining a nonlinear characteristic of the digitally-equalized QPSK signal wherein the nonlinear characteristic is indicative of the transmitter error;
   transmitting an optical control signal to the optical transmitter wherein the optical control signal comprises data that are based on the nonlinear characteristic; and
   modifying a transmitter parameter of the optical transmitter in response to the optical control signal to change the nonlinear characteristic.

10. The method of claim 9 wherein the transmitter parameter comprises one of a timing delay, an IQ bias angle, an IQ gain difference and a modulator bias voltage.

11. The method of claim 9 wherein the QPSK optical signal has a first multi-bit QPSK optical constellation wherein the optical control signal is responsive to a difference in the first multi-bit QPSK optical constellation relative to an ideal multi-bit QPSK optical constellation.

12. An optical communications system comprising:
   an optical receiver configured to receive an optical signal from a first optical transmitter, the optical receiver comprising:
      a memory module to store data derived from a prior digital sampling of the optical signal and configured in a lookup table;
      a first digital signal processor in communication with the memory module, the first digital signal processor generating a digitally-equalized optical signal according to the data stored in the memory module and a digital sampling of the optical signal, the first digital signal processor determining a nonlinear characteristic of the digitally-equalized optical signal; and
      a control module in communication with the first digital signal processor and configured to transmit a control signal to the first optical transmitter in response to the determined nonlinear characteristic.

13. The optical communications system of claim 12 wherein the control module comprises a second optical transmitter and wherein the control signal is an optical control signal.

14. The optical communications system of claim 12 further comprising the first optical transmitter and wherein the first optical transmitter is configured to adjust a transmitter parameter in response to the control signal transmitted by the control module.

15. The optical communications system of claim 12 further comprising a second digital signal processor in communication with the memory module, wherein the data stored in the memory module is derived by the second digital signal processor from the prior digital sampling of the optical signal.

16. The optical communications system of claim 13 wherein the first optical transmitter and the optical receiver are configured to transmit the optical signal and the optical control signal, respectively, over a common optical communications channel.

17. An optical transmitter comprising:
a modulated optical source generating an optical signal comprising optical data to be transmitted to a remote optical receiver and a tapped optical signal; and
a local optical receiver colocated with the modulated optical source and configured to receive the tapped optical signal, the local optical receiver comprising:
a memory module to store data derived from a prior digital sampling of the tapped optical signal, the stored data being configured in a lookup table; and
a digital signal processor in communication with the memory module, the digital signal processor generating a digitally-equalized signal according to the data stored in the memory module and a digital sampling of the tapped optical signal, the digital signal processor determining a nonlinear characteristic of the digitally-equalized signal and providing a control signal to the modulated optical source whereby a transmitter parameter is adjusted in response to the control signal to reduce an impairment of the optical signal due to a transmitter error.

* * * * *